（12） United States Patent
Blumenberg

(10) Patent No.: US 10,001,383 B2
(45) Date of Patent: Jun. 19, 2018

(54) AUTOMATICALLY ORIENTATING A MAP ACCORDING TO THE MAP'S NATURAL VIEWING ORIENTATION

(71) Applicant: Apple Inc., Cupertino, CA (US)

(72) Inventor: Christopher Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 14/503,285

(22) Filed: Sep. 30, 2014

(65) Prior Publication Data

US 2016/0091322 A1    Mar. 31, 2016

(51) Int. Cl.
G01C 21/26    (2006.01)
G09B 29/00    (2006.01)
G01C 21/36    (2006.01)
G06F 3/0484   (2013.01)
G09B 29/10    (2006.01)

(52) U.S. Cl.
CPC ....... *G01C 21/367* (2013.01); *G06F 3/04845* (2013.01); *G09B 29/106* (2013.01); *G09B 29/005* (2013.01)

(58) Field of Classification Search
CPC ........ G08B 29/10; G09B 29/10; G01C 17/28; G08G 1/0969
See application file for complete search history.

(56) References Cited

U.S. PATENT DOCUMENTS 6,366,856 B1    4/2002   Johnson
6,529,828 B1    3/2003   Williams et al.
(Continued)

FOREIGN PATENT DOCUMENTS

EP    1926075    5/2008
WO    WO 2008129437 A1 *    10/2008    ............. G01C 17/30

OTHER PUBLICATIONS

Map, Plan of City and Harbour Savanna 1818, downloaded Jul. 11, 2016.*
(Continued)

*Primary Examiner* — Kevin P Mahne
(74) *Attorney, Agent, or Firm* — Invoke

(57) ABSTRACT

Some embodiments provide a device that automatically orients and displays a map of a region according to the natural viewing orientation of the map. In some embodiments, the device examines data associated with the map to determine whether it can identify a natural viewing orientation of the map that differs from the geographic orientation of the map. When the device is able to identify such a natural viewing orientation, it displays the map according to this natural viewing orientation instead of the geographic orientation of the map. On the other hand, when the device is not able to identify a natural viewing orientation that differs from the geographic orientation, the device displays the map according to its geographic orientation. In some embodiments, the geographic orientation of the map is north-up orientation (where north is up (e.g., top center of the page), south is down, west is left, and east is right). In other embodiments, the geographic orientation of the map can be another orientation that is set by one of the geographic directions, such as south-up map orientation, where south is up, north is down, east is left and west is right.

16 Claims, 13 Drawing Sheets

(56) References Cited

U.S. PATENT DOCUMENTS

| | | | |
|---|---|---|---|
| 6,795,868 B1 * | 9/2004 | Dingman | G06F 17/30569 |
| | | | 707/999.202 |
| 8,050,862 B2 | 11/2011 | Weiss et al. | |
| 8,280,414 B1 | 10/2012 | Nourse et al. | |
| 2002/0193943 A1 | 12/2002 | Hennelly | |
| 2006/0293847 A1 * | 12/2006 | Marriott | G01C 21/32 |
| | | | 701/455 |
| 2013/0086517 A1 * | 4/2013 | Van Lancker | G06F 3/04815 |
| | | | 715/800 |
| 2014/0005928 A1 | 1/2014 | Giannetta et al. | |
| 2014/0114574 A1 * | 4/2014 | Tertoolen | G01C 21/367 |
| | | | 701/533 |
| 2014/0314276 A1 * | 10/2014 | Wexler | G06T 7/602 |
| | | | 382/103 |

OTHER PUBLICATIONS

American Honda Motor Corp., 2013 Pilot Navigation System Manual (Revised Jun. 2013).*

* cited by examiner

AUTOMATICALLY ORIENTATING A MAP ACCORDING TO THE MAP'S NATURAL VIEWING ORIENTATION

BACKGROUND

In many common day settings, maps are viewed according their natural viewing orientations rather than their geographic orientations. For instance, maps of many regions are commonly aligned and viewed at orientations that are not aligned with the geographic north or south directions. Notwithstanding the natural viewing orientations of maps of different regions, devices often display such maps initially according to their geographic orientations, and require users to manually rotate the maps through a range of angles in order to place the maps in their natural viewing orientations.

FIG. 1 illustrates an example of a map 100 that is displayed by a device 105 according to a geographic orientation (i.e., axis) that differs from the commonly viewed orientation (i.e., axis) of the map. Specifically, this figure illustrates a map 120 of Manhattan that is commonly depicted in many common days settings (e.g., in papers maps, on other documents, etc) according to an orientation that is about 20° rotated from the true geographic axis of the actual geographic map 100 of Manhattan. The map 120 is rotated because its natural viewing position is at the 20° rotated view due to the shape of Manhattan and the layout of the majority of the perpendicular streets of Manhattan.

FIG. 1 illustrates that even though the common viewing orientation of the map of Manhattan is the 20°-rotated view, a device 105 initially displays the map of this city in terms of the true geographic orientation of this city. In other words, the device 105 initially shows the true-geographic map 100 instead of the map 120. The user then has to rotate the displayed map through a range of angles from 0°-20°, until the map is oriented according to its common viewing position. Such manual adjustments are inefficient and should be eliminated if possible.

BRIEF SUMMARY

Some embodiments provide a device that automatically orients and displays a map of a region according to the natural viewing orientation of the map. In some embodiments, the device examines data associated with (e.g., distributed with) the map to determine whether it can identify a natural viewing orientation of the map that differs from the geographic orientation of the map. When the device is able to identify such a natural viewing orientation, it displays the map according to this natural viewing orientation instead of the geographic orientation of the map. On the other hand, when the device is not able to identify a natural viewing orientation that differs from the geographic orientation, the device displays the map according to its geographic orientation.

In some embodiments, the geographic orientation of the map is north-up orientation (where north is up (e.g., top center of the page), south is down, west is left, and east is right). In other embodiments, the geographic orientation of the map can be another orientation that is set by one of the geographic directions, such as south-up map orientation, where south is up, north is down, east is left and west is right.

In different embodiment, the device uses different automated processes to determine whether the map of the region has a natural viewing orientation that is different than its geographic orientation. These automated processes do not require user intervention. Also, in some embodiments, these automated processes do not account for the direction of travel of the device on which the map is being displayed. In some embodiments, the device examines metadata embedded with the map data to determine whether the metadata specifies a different natural viewing orientation for a particular region of the map. For instance, in some embodiments, the device retrieves (e.g., receives or downloads) data for a map of a geographic area (e.g., city, state, country, etc.), and this data may include metadata that describes the geographic area. When the device has to present a map of the particular region (e.g., neighborhood, city, state, etc.) within the geographic area, the device in some embodiments determines whether the retrieved map data includes metadata that specifies that the particular region has to be displayed initially at natural viewing orientation that differs from the true geographic orientation of the particular region.

The metadata for different regions in the geographic area can be specified differently in different embodiments. In some embodiments, the metadata for different regions is manually entered by the map designer(s) or distributor(s). Alternatively, the metadata is automatically generated by analyzing harvested data regarding adjusted viewing orientations of the regions. For instance, map-distribution servers of some embodiments collect map-view data that shows that a large percentage of users of different devices manually adjust the map of a region to a particular orientation. Based on this collected data, the map-distribution servers of some embodiments embed metadata in the map data that specifies the harvested adjusted orientation as the natural viewing orientation of the region.

Instead of relying on such metadata, the device of other embodiments uses other processes to determine whether a map of a region has a natural viewing orientation. For instance, in some embodiments, the device analyzes the road data in the particular region to determine whether there is a natural viewing orientation for viewing the road network on the particular region that differs from the geographic orientation of the region. In some embodiments, the retrieved map specifies the road data in terms of vector data, which the device analyzes to determine whether the road network in the region has a predominant direction that should be used to orientate the map of the region. Instead of, or in conjunction with, examining the road data, the device of some embodiments examines landmarks in the region to determine whether a natural viewing orientation exists for the region.

Even when the map of a region has a natural viewing orientation that differs from its geographic orientation, the device of some embodiments does not display the map of the region at its natural viewing orientation when it has to display the map at a certain zoom level that would render the natural viewing orientation as less relevant. For instance, in some embodiments, the map data for New York, will specify a 20°-rotated view as the natural viewing orientation for viewing Manhattan. When displaying just Manhattan or a portion of Manhattan, the device of some embodiments uses this natural viewing orientation to initially display the map of this region. However, when the device has to display the map at a particular zoom level that results in the displayed map subsuming much of the areas surrounding Manhattan, the device displays the map according to a true geographic orientation (e.g., according to the north-up orientation), and not according to the natural viewing orientation of Manhattan.

In some embodiments, the device displays a compass along with the map to show the geographic orientation of the map. When the device shows a map of a region according to the region's natural viewing orientation, the compass indicates the orientation of the map (e.g., shows a 20° rotation). In some embodiments, the device allows a user to rotate the map, which causes the compass to rotate to display the adjusted orientation of the map. The compass is a selectable control in some embodiments, which when selected causes the display of the map to return back to its natural viewing orientation. In some embodiments, the selection of the compass while the map is displayed in its natural viewing orientation, directs the device to display the map according to its true geographic orientation. Instead of, or in conjunction with, using the compass to perform these map-rotating operations, the device of some embodiments uses other affordances to rotate the map to its natural viewing orientation or to its geographic orientation.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that automatically orients and displays a map of a region according to a natural viewing orientation of the map that can differ from the geographic orientation of the map. In some embodiments, the geographic orientation of the map is north-up orientation (where north is up (e.g., top center of the page), south is down, west is left, and east is right). In other embodiments, the geographic orientation of the map can be another orientation that is set by one of the geographic directions, such as south-up map orientation, where south is up, north is down, east is left and west is right. On the other hand, the natural viewing orientation of the map of a region in some embodiments is an orientation that comports to the commonly viewed, displayed and/or generated orientations of the maps of that region. Alternatively, the natural viewing orientation of the map of a region in some embodiments comports with the content that is displayed on the map. In some embodiments, the natural viewing orientation that the method uses for a map of a first region is the commonly viewed, displayed and/or generated orientation of the map for the first region, while the natural viewing orientation that the method uses for a map of a second region is identified based on the content displayed on the map.

Figure 1:
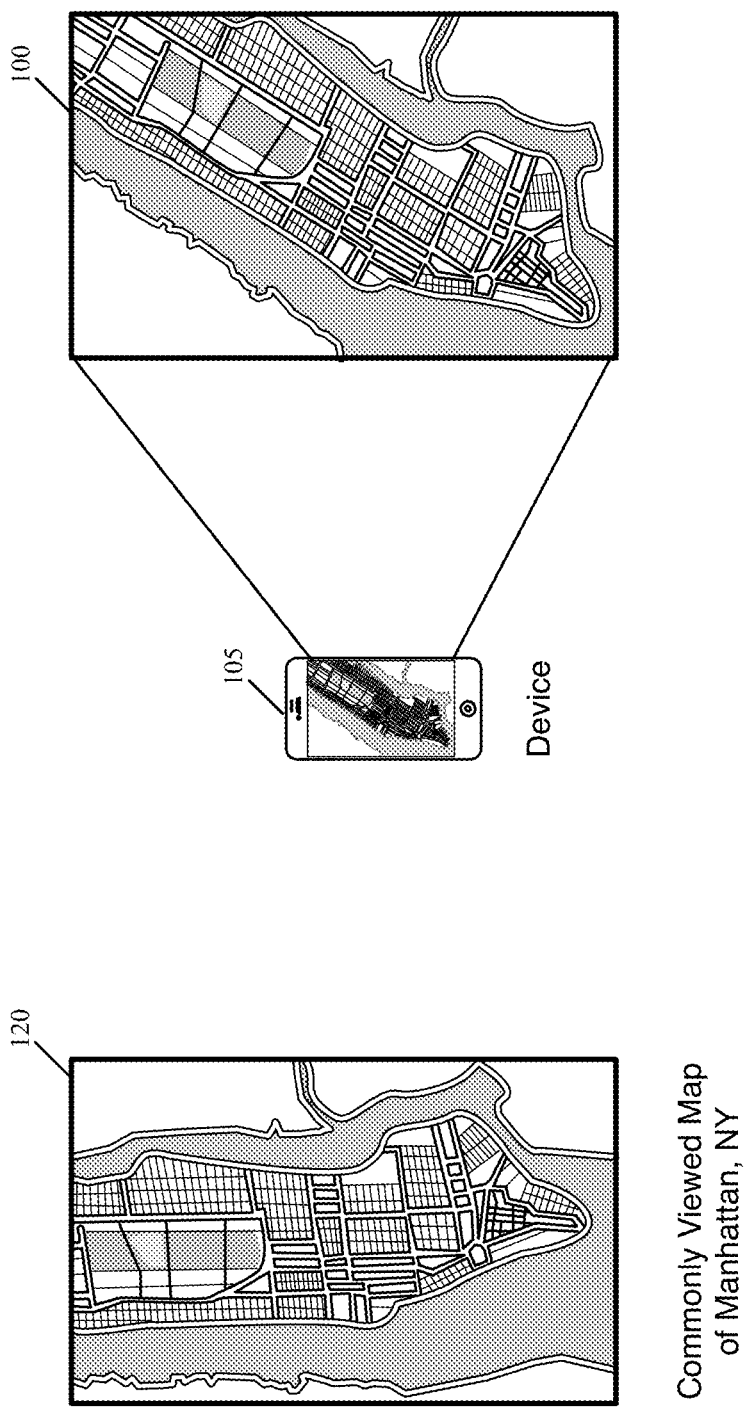
FIG. 1 illustrates common depiction of Manhattan in printed and device-displayed maps.
Figure 2:
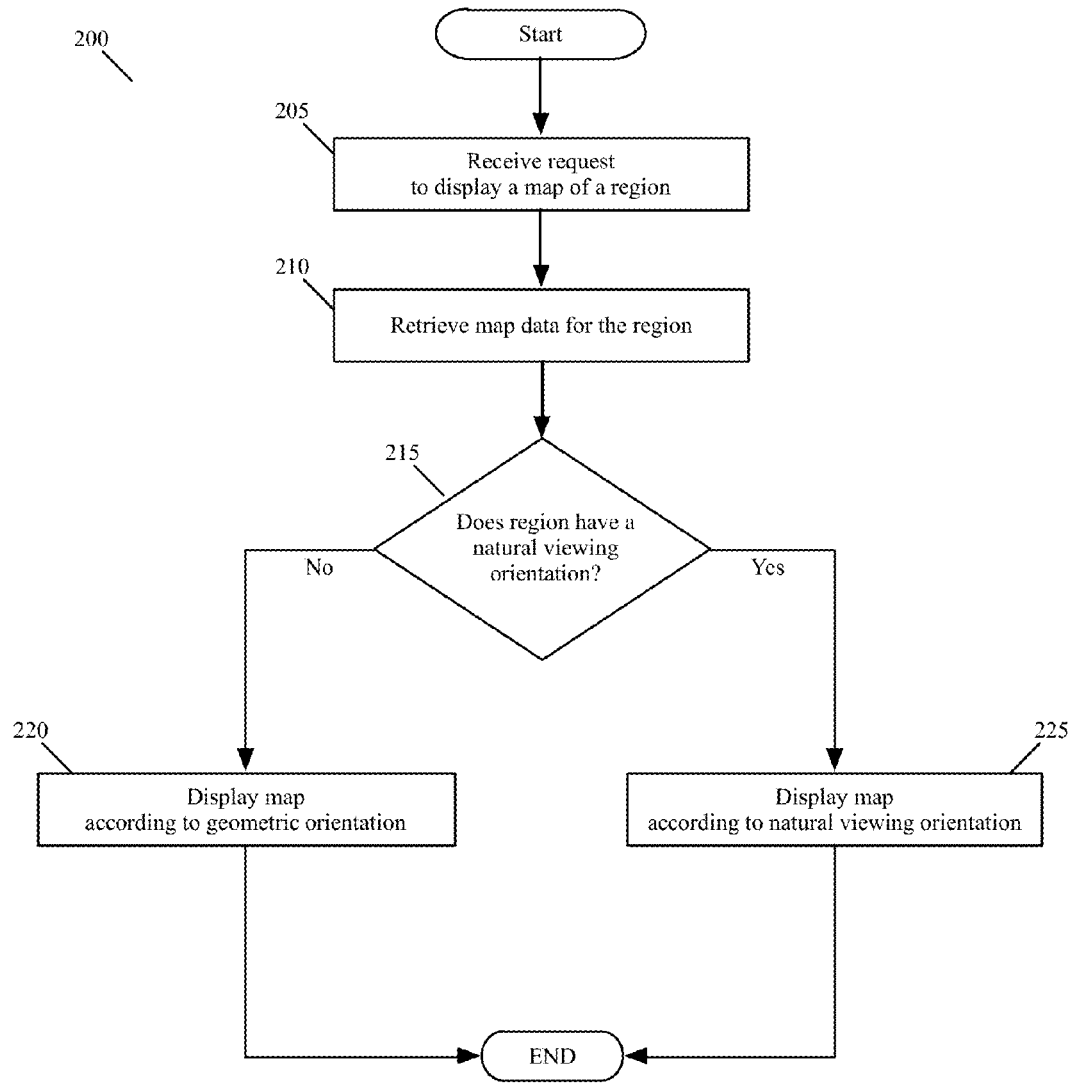
FIG. 2 conceptually illustrates a process for displaying a map according to its natural viewing orientation.

FIG. 2 conceptually illustrates a process 200 that implements the automatic-orientating method of some embodiments. In some embodiments, the process 200 is performed by a device. The device in some embodiment is a handheld device or a computer that displays the map. In other embodiments, the device is a server that transmits the map to another device that then displays the map. The process 200 will be described below by reference to an example of handheld device 3 of FIG. 3 that performs this process. However, one of ordinary skill will realize that this process can be performed by any kind of device (e.g., a desktop or laptop computer, a server, etc.).

As shown, the process 200 initially starts when it receives (at 205) a request to display a map of a region. This request can come from a user of a map application (e.g., a map application that implements the process 200) or from another application that needs to display the map. In response to the received request, the process 200 retrieves (at 210) map data for the geographic area (e.g., city, state, country, etc.) that contains the region that needs to be displayed. Examples of such retrieval include (1) downloading the map data from a server through a communication network, or (2) retrieving the map data from a local storage that contains this data or a cached copy of this data. When retrieving the map data for the requested region, the process 200 in some embodiments retrieves the map data for a larger region that contains the requested region, so that the process can have sufficient data to quickly show areas surrounding the requested region.

Figure 3:
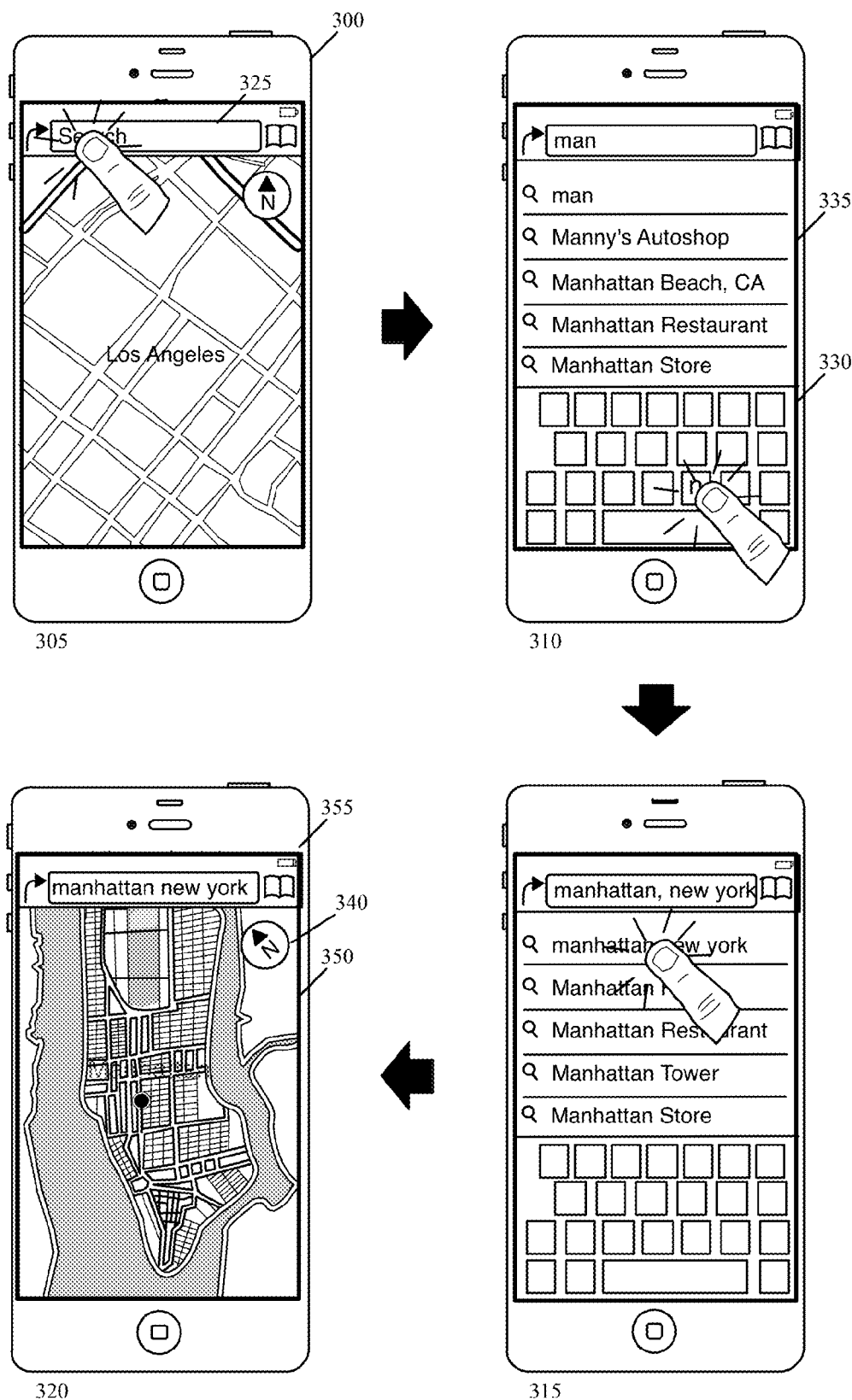
FIG. 3 illustrates an example of presenting the map of Manhattan according to its natural viewing orientation.

FIG. 3 illustrates examples of the request (at 205) for the display of a map of a region, and the subsequent retrieval (at 210) of the map data associated with the requested region. This example illustrates four stages 305-320 of operation of a map application that executes on a handheld device 300 to implement the process 200. The device 300 has a touch-sensitive screen.

The first three stages 305-315 show operations associate with a request to view a map of Manhattan. The first stage 305 shows the map application displaying a map of Los Angeles. It also shows the user selecting a search field 325 to enter the name of a location to view on a map. The second stage 310 shows that in response to the selection of the search filed 325, the map application has presented a keyboard 330. This stage also shows that through the keyboard 330, the user has entered three characters "m," "a," and "n." In response to these entered characters, the map application presents several candidate locations 335 below the search field 325.

The third stage 315 then shows the user selecting Manhattan, N.Y. from the list of candidate locations 335. In response to this selection, the map application retrieves map data regarding Manhattan by (1) downloading the map data from a server through a communication network (e.g., a wireless telephone/data network), or (2) retrieving the map data from its local cache storage when the map application had previously downloaded this data. When retrieving the map data for Manhattan, the device 300 in some embodiments retrieves the map data for the boroughs surrounding Manhattan, so that it can have sufficient data to quickly show the surrounding boroughs.

Once the process 200 retrieves (210) the map data for the requested region, the process determines (at 215) whether the map of the requested region should be displayed according to a natural viewing orientation of the map that differs from the geographic orientation of the map. To do this, the process in some embodiments examines (at 215) data associated with (e.g., distributed with) the map to determine whether it can identify a natural viewing orientation of the map that differs from the geographic orientation of the map.

In different embodiment, the process 200 uses different automated techniques to determine whether the map of the region has a natural viewing orientation that is different than its geographic orientation. These techniques in some embodiments do not require user intervention. Also, in some embodiments, these automated techniques do not account for the direction of travel of the device on which the map is being displayed.

In some embodiments, the process examines metadata embedded with the retrieved map data (i.e., the map data retrieved at 210) to determine whether the metadata specifies a natural viewing orientation for the requested region (i.e., the region requested at 205) that differs from the true geographic orientation of the requested region. The metadata for different regions in the geographic area can be specified differently in different embodiments. In some embodiments, the metadata for different regions is manually entered by the map designer(s) or distributor(s). Alternatively, the metadata is automatically generated by analyzing harvested data regarding adjusted viewing orientations of the regions. For instance, map-distribution servers of some embodiments can collect map-view data from the users of mobile devices that download map data from the servers. For certain regions (localities), the map servers can then determine that a large percentage of users of different devices manually adjust the map of a region to a particular orientation (referred to as harvested adjusted orientation). Based on this collected data, the map-distribution servers of some embodiments embed metadata in the map data that specifies the harvested adjusted orientation as the natural viewing orientation of the region.

Instead of relying on such metadata, the process of other embodiments uses (at 215) other techniques to determine whether a map of a region has a natural viewing orientation. For instance, in some embodiments, the process analyzes (at 215) the road data in the particular region to determine whether there is a natural viewing orientation for viewing the road network on the particular region that differs from the geographic orientation of the region. In some embodiments, the retrieved map specifies the road data in terms of vector data, which the process 200 analyzes (at 215) to determine whether the road network in the region has a predominant direction or directions that should be used to orient the map of the region. Instead of, or in conjunction with, examining the road data, the process of some embodiments examines landmarks in the region to determine whether a natural viewing orientation exists for the region.

When the process 200 is not able to identify (at 215) a natural viewing orientation that differs from the geographic orientation, the process displays (at 220) the map according to its geographic orientation, and then ends. The geographic orientation of the map is an orientation that aligns the map on a display screen according to the geographic north, south, east, and west directions of the map. For instance, in some embodiments, the map's geographic orientation is a north-up display that displays the north end of the map on the top end (e.g., top side) of the display screen. As mentioned above, in some embodiments, a map's geographic orientation can also be a south-up display that displays the south end of the map on the top end (e.g., top side) of the display screen. The top end of the display screen is a fixed location on the display screen in some embodiments. In other embodiments that allow a map to rotate on the display screen as the screen rotates (e.g., as the handheld device, that includes the screen, rotates), the top end of the display screen is a location on the screen that for any given rotation of the screen is designated as the top end of the screen.

On the other hand, when the process 200 is able to identify (at 215) a natural viewing orientation for the requested region that differs from the geographic orientation of that region, the process displays (at 225) the map according to this orientation instead of the geographic orientation of the map, and then ends. One example of a map that is shown according to its natural viewing orientation is provided in FIG. 3. Specifically, the fourth stage 320 of this figure illustrates that after the user asks to view the map of Manhattan, the map application of the device 300 displays this map according to its natural viewing orientation.

The natural viewing orientation of Manhattan is about 20° rotated from the true geographic orientation of the actual geographic map 115 of Manhattan. In this orientation, the top of the island of Manhattan is aligned with the top end 355 of the display screen 350 of the device 300. As mentioned above, the natural viewing orientation of Manhattan comports with how Manhattan is often depicted in printed maps or in the media. This orientation is based on the shape of island and the layout of the majority of its perpendicular streets.

In the example illustrated in FIG. 3, the map application displays compass 340 that provides an indication of the 20°-rotated presentation of the map of Manhattan. Specifically, in the fourth stage 320, the compass 340 illustrates the geographic north to be at an angle of about 110°, which is 20° off the 90° direction which the compass would point to when the map is being presented according to a north-up orientation. An example of such a 90° north-up orientation of the compass is illustrated in the first stage 305, which depicts a north-up view of a region of Los Angeles.

Even when the map of a region has a natural viewing orientation that differs from its geographic orientation, the process of some embodiments does not display the map of the region at its natural viewing orientation when it has to display the map at a certain zoom level that would render the natural viewing orientation as less relevant. Zoom level refers to the scale level at which a view of the map is displayed. In some embodiments, a higher zoom level corresponds to a zoomed out view that shows a larger portion of a map of a region than the map portion that is displayed in zoomed in view of a lower zoom level. However, the notation of high and low zoom level is arbitrary. As such, some embodiments might define a higher zoom level to be a zoomed in view that shows a smaller portion of a region's map than a lower zoom level (which, in this instance, corresponds to a zoomed out view). Irrespective of how zoom level is defined, the zoom level refers to the scale level at which a map view is displayed, and changing the zoom level changes the portion of the map that is presented in the displayed map view.

Figure 4:
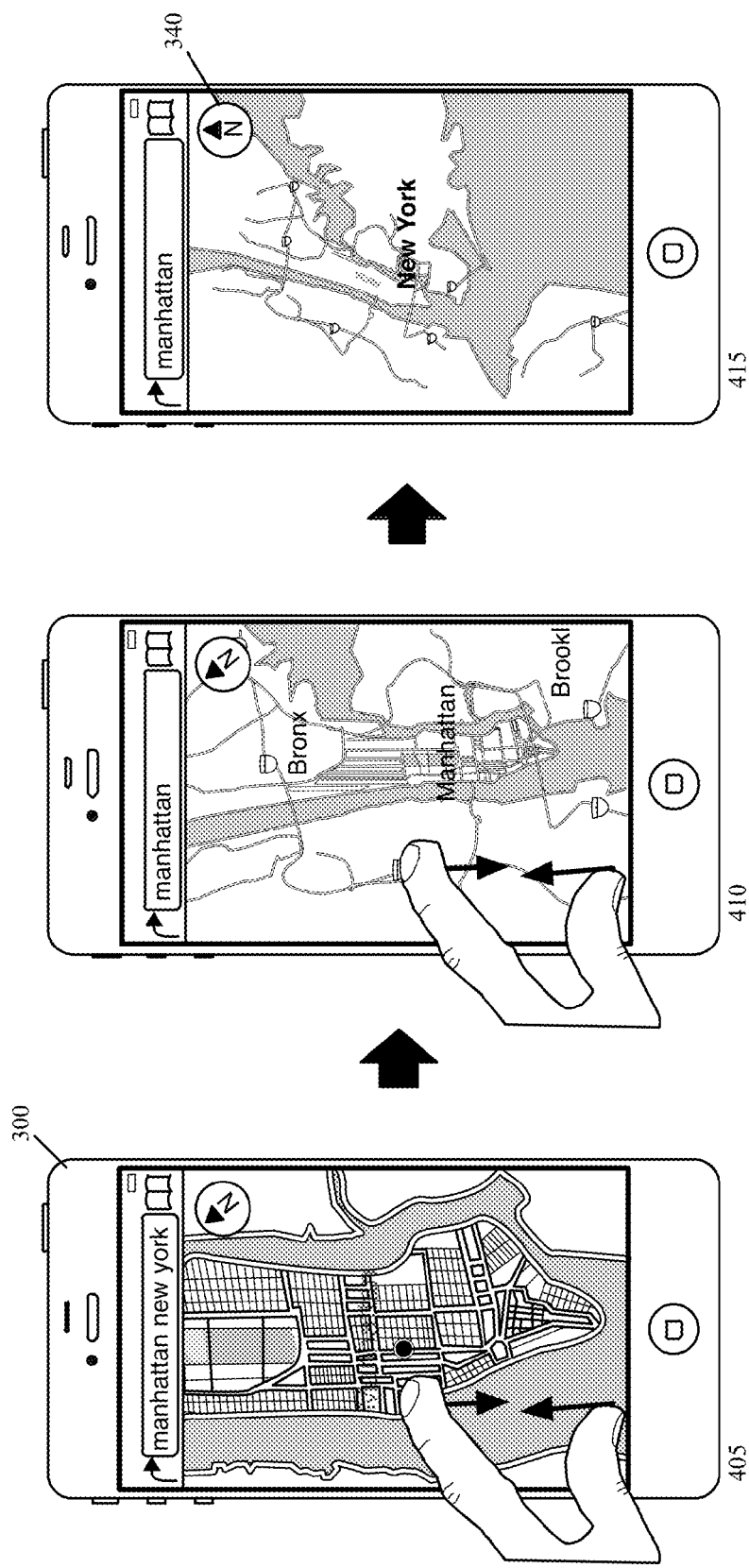
FIG. 4 illustrates an example of changing the display of a map from the natural viewing orientation for Manhattan to a north-up orientation after the map has been zoomed out to a particular level.

FIG. 4 illustrates an example of a map application not using the natural viewing orientation of the map of a region when the map is being viewed at a particular zoom level. The example of FIG. 4 starts after the fourth stage 320 of FIG. 3. The example of FIG. 4 is illustrated in terms of three operational stages 405-415 of the map application, as it performs a zoom out operation in response to multi-touch gestural input from a user. The device 300 can process multi-touch gestural input because it has a multi-touch input interface in some embodiments.

The first stage 405 shows the user starting a zoom out operation by performing a two-finger pinch operation on the screen, while the screen is displaying the 20°-rotated view of the map of Manhattan because this view is the natural viewing orientation of Manhattan. The second stage 410 shows the map application maintaining the 20°-rotated view of the map even after the map application has changed the zoom level of the displayed map in response to the ping input of the first stage 405. In the zoomed out view of the second stage 410, more of the areas surrounding Manhattan can be viewed, but not enough to switch the orientation of the map from the natural viewing orientation for Manhattan to the geographic viewing orientation that would be more appropriate to view the state of New York.

The second sage 410 also shows the user continuing the two-finger pinch operation on the screen. In response to the continuation of the pinch operation, the map application changes the zoom level for displaying the map to a level that now shows much of the state of New York. Accordingly, the map application in the third stage 415 changes the orientation of the map from the 20°-rotated view to a north-up view, as indicated by the north arrow of the compass 340 pointing in the 90° vertical direction. The map application changes the orientation of the map because, at this stage, the zoom level results in the displayed map subsuming (i.e., including) a sufficiently large area around Manhattan, such that the 20°-rotated view, which makes sense for displaying Manhattan, no longer makes sense for the portion of New York that is displayed in the map.

Figure 5:
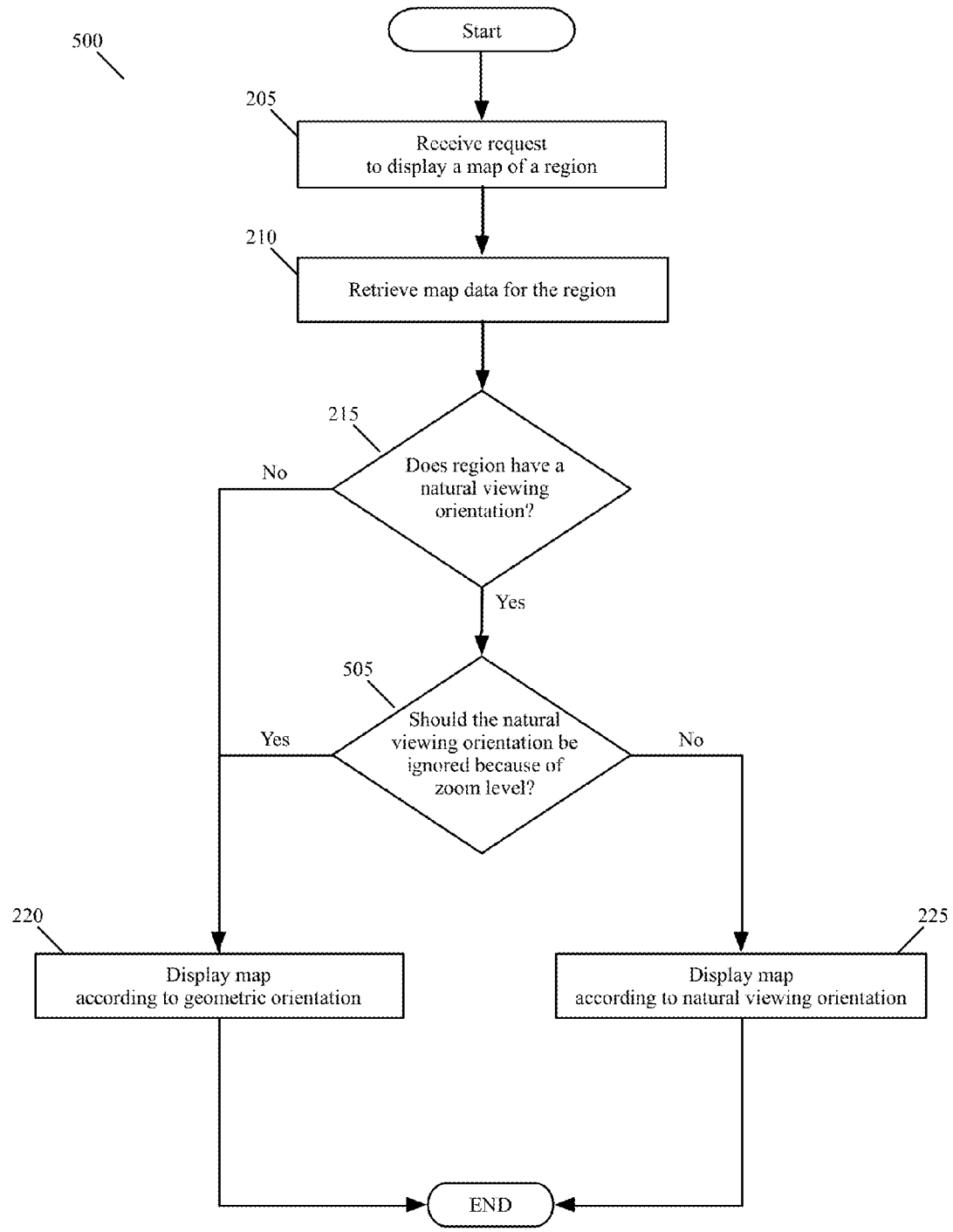
FIG. 5 conceptually illustrates another process for displaying a map according to its natural viewing orientation.

In some embodiments, the determination of the type of map (i.e., the natural viewing orientation map or a geographic orientation map) that is appropriate for a particular region at a particular zoom level is a determination that is made by the designer or distributor of map. To illustrate this point, FIG. 5 presents a process 500 that some embodiments use to determine whether to display a map of a region according to a natural viewing orientation. This process 500 is similar to the process 200 of FIG. 2, except that it includes an extra operation 505.

The process 500 transitions to 505 from 215, after it determines (at 215) that the region that is requested for display has a natural viewing orientation (e.g., determines that the retrieved map data includes metadata that specifies that the requested region has a natural viewing orientation). At 505, the process determines whether the natural viewing orientation of the requested region should be ignored because this orientation is not valid for the zoom level at which the map application is going to display the map of the region. The process 500 (1) displays (at 220) the map according to the geographic orientation (e.g., a north-up display) when it determines (at 505) that the natural viewing orientation should be ignored for the current zoom level, or (2) displays (at 225) the map according to the geographic orientation (e.g., a north-up display) when it determines (at 505) that the natural viewing orientation should not be ignored for the current zoom level.

One of ordinary skill will realize that the sequences of operations conceptually illustrated in FIGS. 2 and 5 are simply exemplary sequences of operations, and that other embodiments may use other sequences of operations. For instance, to assess whether a natural viewing orientation should be used for a map that is displayed at a particular zoom level, the process of some embodiments performs the two operations 215 and 505 as one operation that determines whether a natural viewing orientation exists for a particular zoom level display of a particular region.

Figure 6:
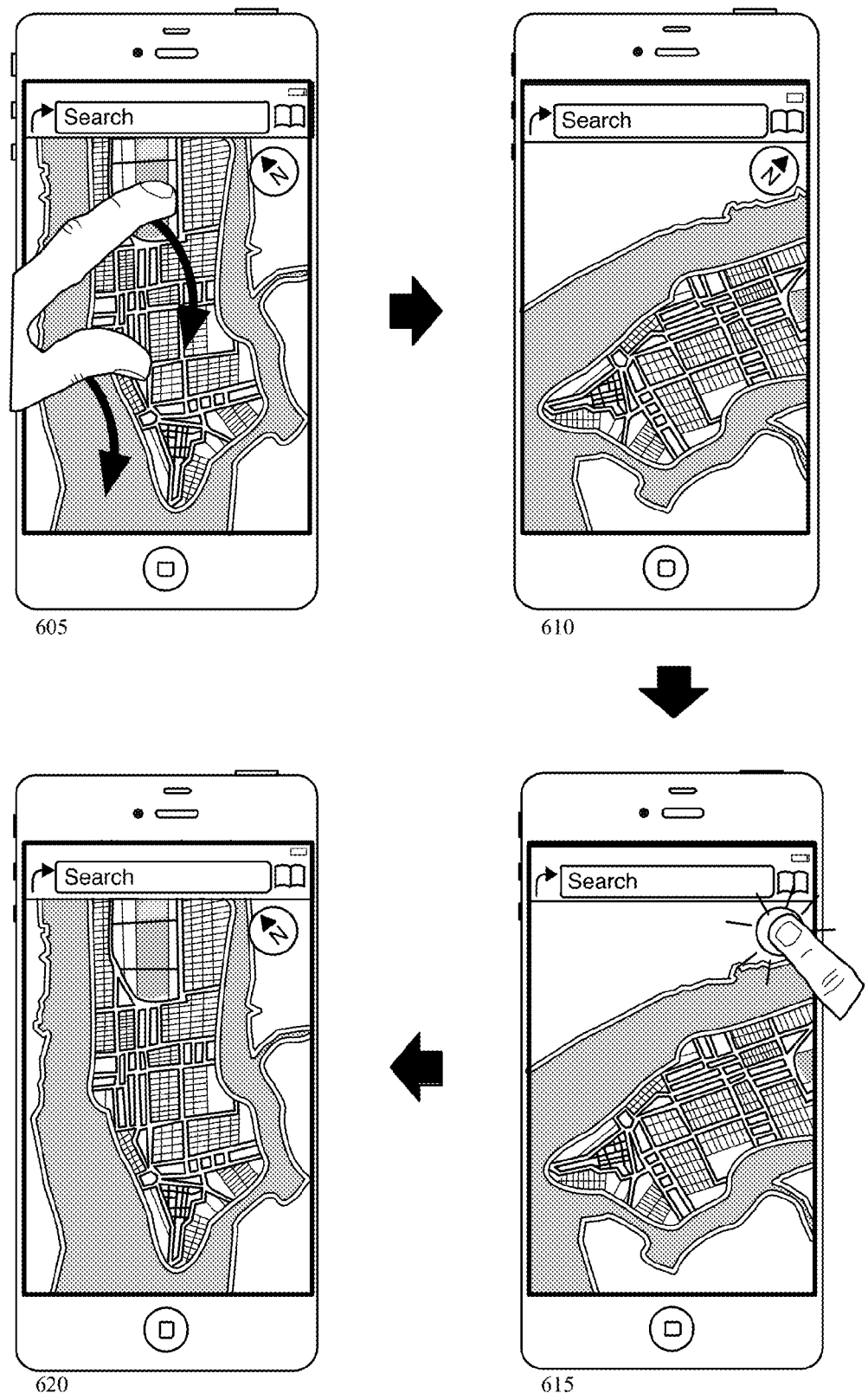
FIG. 6 illustrates an example of changing the display of a map to its natural viewing orientation from another orientation.

The device of some embodiments provides user interface affordances to rotate a map and to return a map to its natural viewing orientation after it has been rotated. FIG. 6 illustrates an example of these affordances for some embodiments of the invention. The example of FIG. 6 starts after the fourth stage 320 of FIG. 3. The example of FIG. 6 is illustrated in terms of four operational stages 605-620 of the map application, as it performs a manual rotation operation in response to multi-touch gestural input from a user, and a snap-back operation to return the map to its natural viewing orientation.

The first stage 605 shows the user starting a rotation operation by performing a two-finger rotation operation on the device's touch-sensitive screen, while the screen is displaying the 20°-rotated view of the map of Manhattan. In this example, the two-finger rotation operation rotates the top finger in a clockwise direction while holding the bottom finger still or having the bottom finger rotate clockwise as well.

The second stage 610 shows the map after it has been rotated by 40° as a result of the rotation operation. The amount of the rotation can be ascertained by the direction of the north arrow of the compass in the first and second stages 605 and 610. The third sage 615 then shows the user selecting the compass by tapping on it once. In response to this tap, the map application returns the map to its natural viewing orientation, which is the 20°-rotated view of Manhattan, as shown by the fourth stage 620. Accordingly, the example presented in FIG. 6 illustrates that in some embodiments a single tap of the compass returns a rotated map to its natural viewing orientation when the map has such an orientation for the displayed zoom level.

Figure 7:
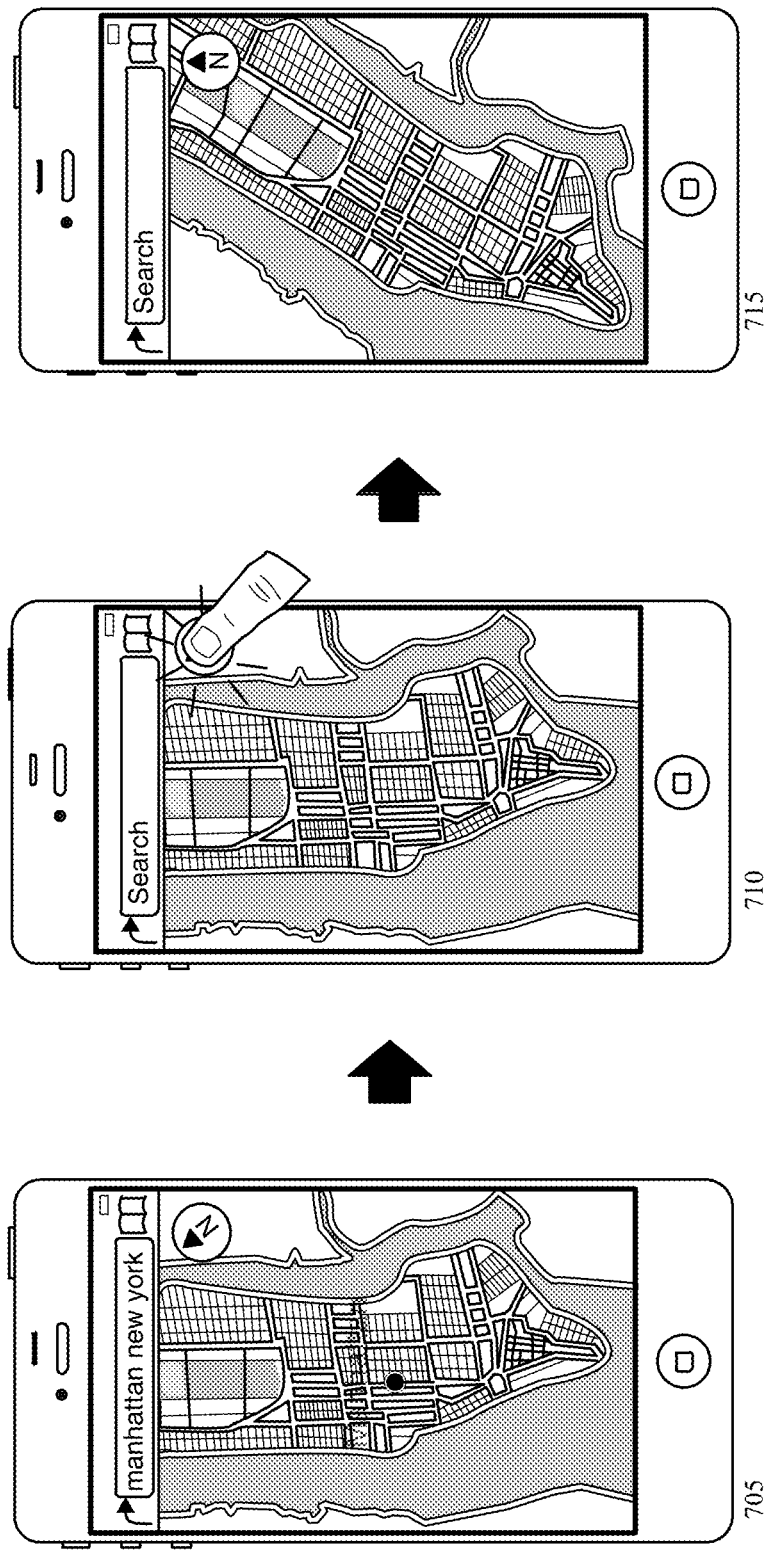
FIG. 7 illustrates an example of changing the display of a map from the natural viewing orientation to a north-up orientation.

In some embodiments, a single tap of the compass when the map is displayed according to its natural viewing orientation directs the map application to rotate the map to its geographic viewing orientation. FIG. 7 illustrates an example of this in terms of three operational stages 705-715. The example of FIG. 7 starts after the fourth stage 320 of FIG. 3, or the fourth stage 620 of FIG. 6. The first stage 705 shows the map application displaying a map of Manhattan according to its natural viewing orientation, which is the 20°-rotated view. The second sage 710 shows the user selecting the compass by tapping on it once. In response to this tap, the map application rotates the map to its north-up geographic viewing orientation, as shown by the third stage 715.

Figure 8:
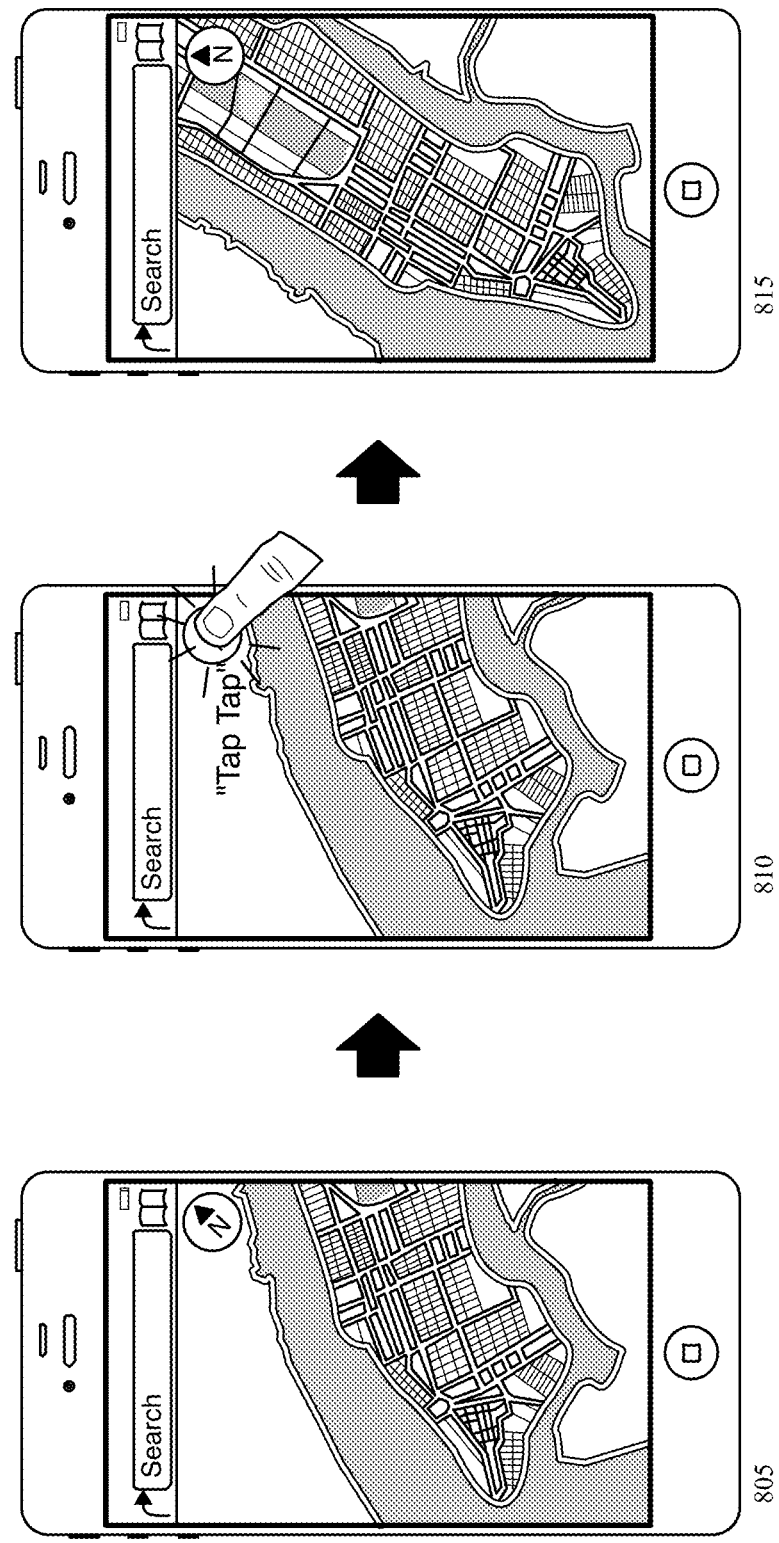
FIG. 8 illustrates another example of changing the display of a map from the natural viewing orientation to a north-up orientation.

FIG. 8 illustrates an example that shows that the map application in some embodiments rotates the map to its geographic viewing orientation when a user double-taps the compass. This example is illustrated in three stages 805-815. The first stage 805 shows the map of Manhattan after it has been rotated to −20°-rotated view of the second stage 610 of FIG. 6. The second sage 810 shows the user performing a double-tap operation on the compass. In response to this double tap, the map application rotates the map to its north-up geographic viewing orientation, as shown by the third stage 815.

In the examples illustrated in FIGS. 6-8, the selection of the compass directs the map application to rotate the map to its natural viewing orientation or to its geographic viewing orientation. Instead of, or in conjunction with, using the compass to perform these map-rotating operations, the device of some embodiments uses other affordances to rotate the map to its natural viewing orientation or to its geographic orientation.

In several examples that were described above, the map application of some embodiments shows a map of a region according to that region's commonly viewed, displayed and/or generated map orientation. For instance, its several examples above, the map application displays Manhattan according to its logical north orientation. However, as mentioned above, some embodiments identify the natural viewing orientation of a map of a region according to the content of that is displayed on the map.

Figure 9:
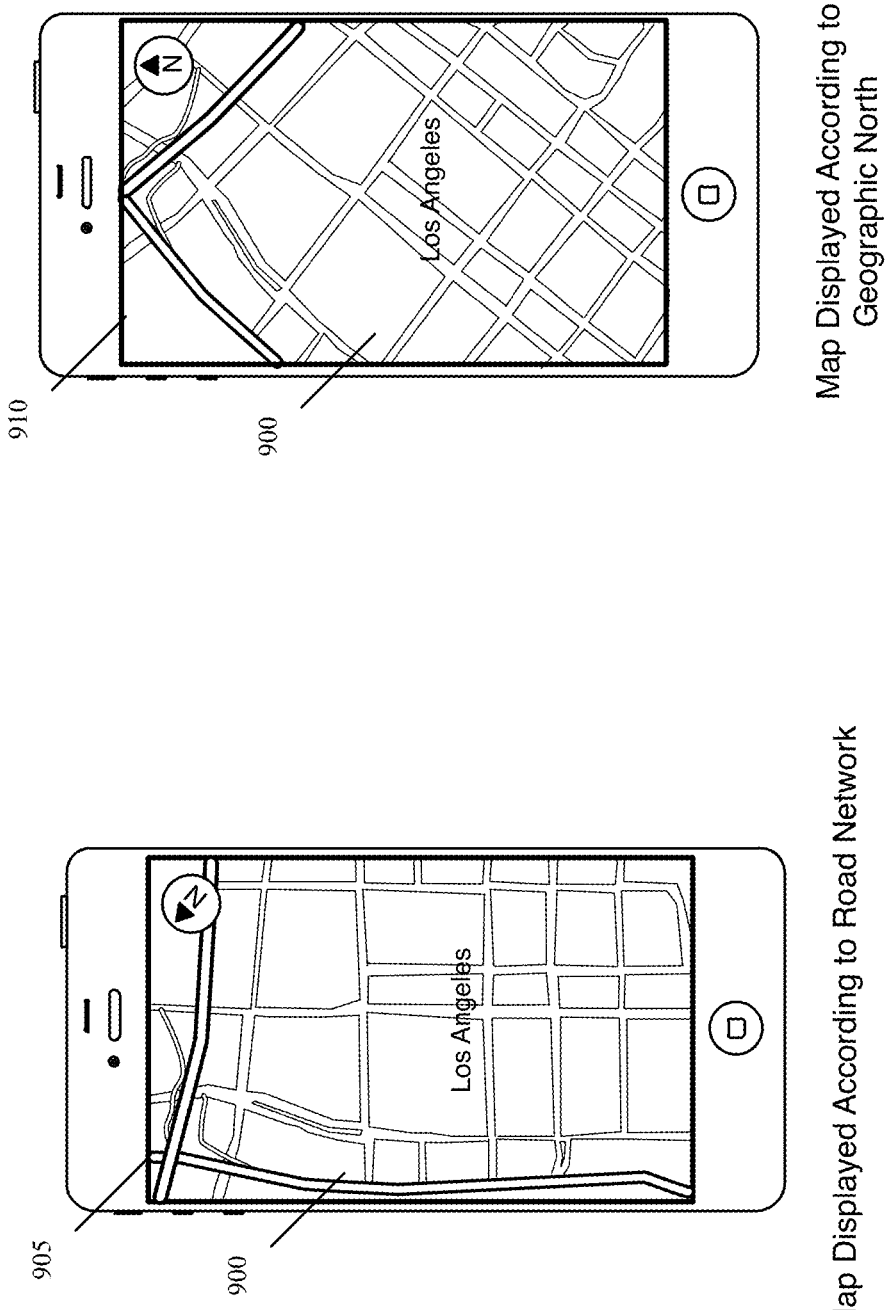
FIGS. 9 and 10 illustrates two examples that shows some embodiments presenting a rotated view of a map of a region based on the content that is being presented in the displayed map.
Figure 10:
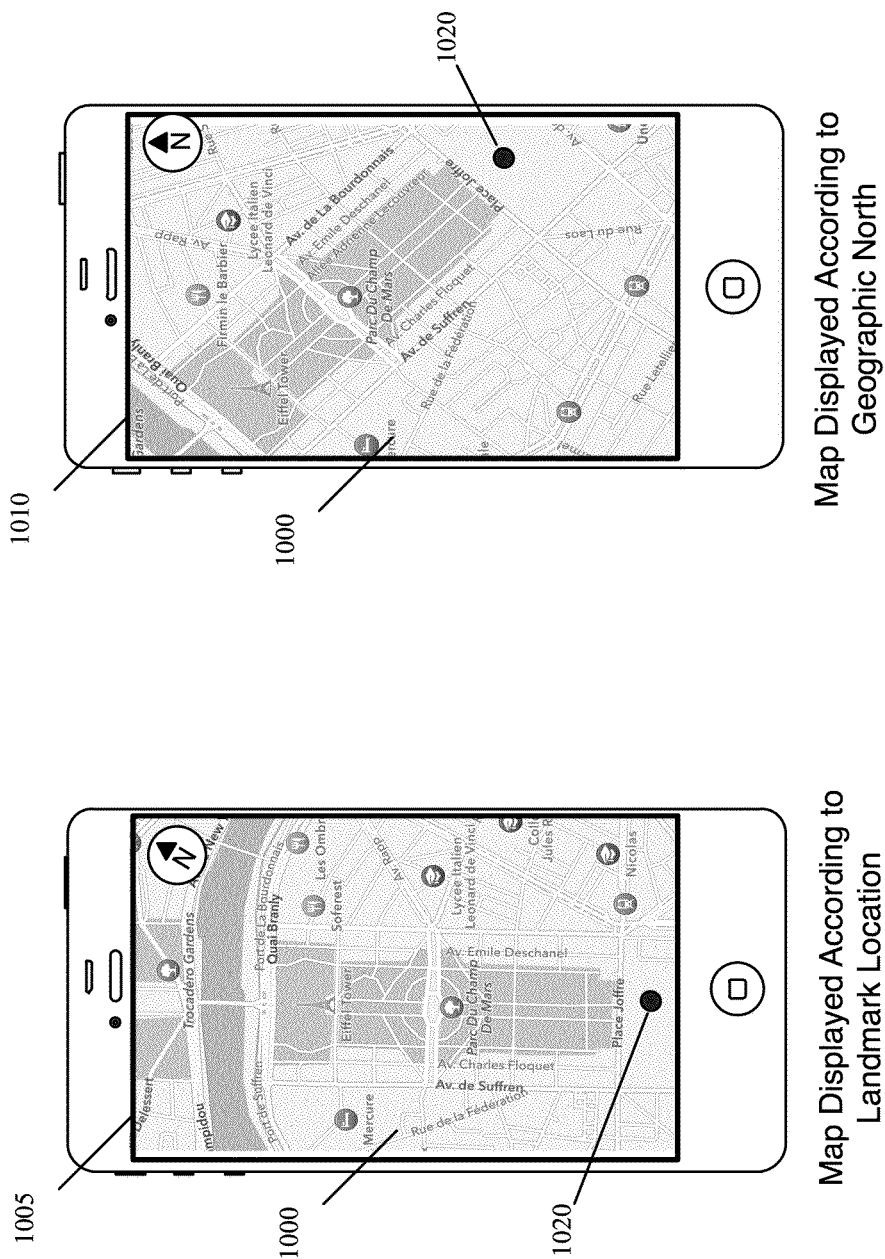

FIGS. 9 and 10 illustrates two examples that shows the map application of some embodiments presenting a rotated view of a map of a region based on the content that is being presented in the displayed map. In these examples, the map application of a mobile device displays the map of a region based on the natural viewing orientation of the region (as determined by the content of the map being presented) rather than the geographic north orientation of the map. In some embodiments, this natural viewing orientation of a region is the initial presentation of the map of the region when the map application first displays this viewing orientation. In other embodiments, this natural viewing orientation is the orientation that the user selects through a single selection (e.g., a tap selection) of an orientation control (as opposed to a manual rotation of the map through a range of rotation angles).

FIG. 9 illustrates the map application displaying a map 905 of a region in Los Angeles that is displayed according to a natural viewing orientation that is defined based on the road network that is being displayed by the map. As shown, this road network 900 has a large number of streets that are perpendicular to each other. The map 905 is oriented by about 10 degrees so that the perpendicular streets appear as vertical or horizontal streets. FIG. 9 also shows a map 910 of this region that is aligned according to the geographic north orientation. In the map 910, the perpendicular streets of the road network 900 are not horizontal or vertical, and instead appear about 80 degrees and 170 degrees. Showing perpendicular streets of a locality as horizontal and vertical lines helps a person that views the map to easily correlate the intersection of the streets to his or her direction of travel.

The mapping application of some embodiments analyzes the road data in the particular region to determine whether there is a natural viewing orientation for viewing the road network on the particular region that differs from the geographic orientation of the region. In some embodiments, the retrieved map specifies the road data in terms of vector data, which the mapping application analyzes to determine whether the road network in the region has a predominant direction that should be used to orient the map of the region, so that the major streets or the majority of the streets of the region appear as horizontal and/or vertical roadways on the map.

Instead of, or in conjunction with, examining the road data, the device of some embodiments examines landmarks in the region to determine whether a natural viewing orientation exists for the region. FIG. 10 illustrates an example in which the mapping application of some embodiments displays a map of a region according to a natural viewing orientation that is derived based on a landmark that is displayed in that region's map. In this example, the map application displays a map 1005 of a region in Paris around the Eiffel Tower. This map 1005 is displayed according to a natural viewing orientation that is defined based on the Eiffel Tower appearing centered at the top of the displayed map based on a current location 1020 of the device on which the mapping application is executing. The map 1005 is oriented by about minus 15-20 degrees. FIG. 10 also shows a map 1010 of this region that is aligned according to the geographic north orientation. In the map 1010, the Eiffel Tower is rotated by 15-20 degrees from a line (not shown) that would connect the device's current location 1020 and the center position of the top of the device.

In some embodiments, landmarks in a region of a map are tagged in order to allow the mapping application to differentiate them from other points of interest (POIs) in the map. The mapping application of these embodiments can then select one landmark and base the orientation of the displayed map by placing this landmark at an upward center location on the displayed map in view of the device's current location. Alternatively, the mapping application of some embodiments selects couple of landmark locations, identifies a center location based on these landmark locations (e.g., identifies a centroid or medoid location based on the landmark locations), and positions this center location at an upward center location on the displayed map. In some embodiments, the natural viewing orientation that the method uses for a map of a first region is the commonly viewed, displayed and/or generated orientation of the map for the first region, while the natural viewing orientation that the method uses for a map of a second region is identified based on the content displayed on the map.

Several of the above-described examples are implemented on a mapping application that executes on top of the operating system of a device. One of ordinary skill will realize that the map orienting feature of some embodiments are implemented by the operating system of the device, and/or by other applications on the device.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
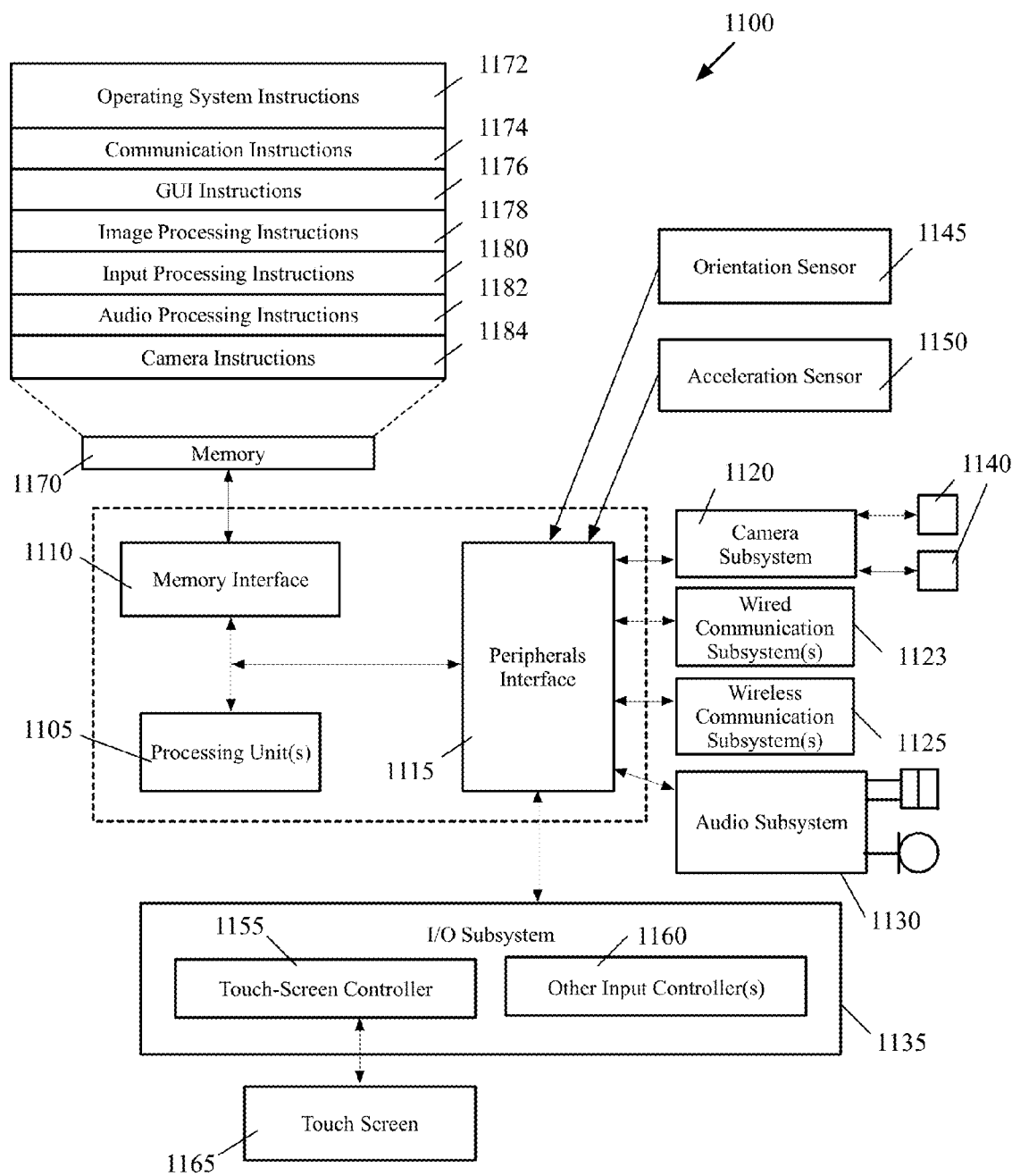
FIG. 11 illustrates an example of an architecture of a mobile computing device.

The applications of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

Figure 12:
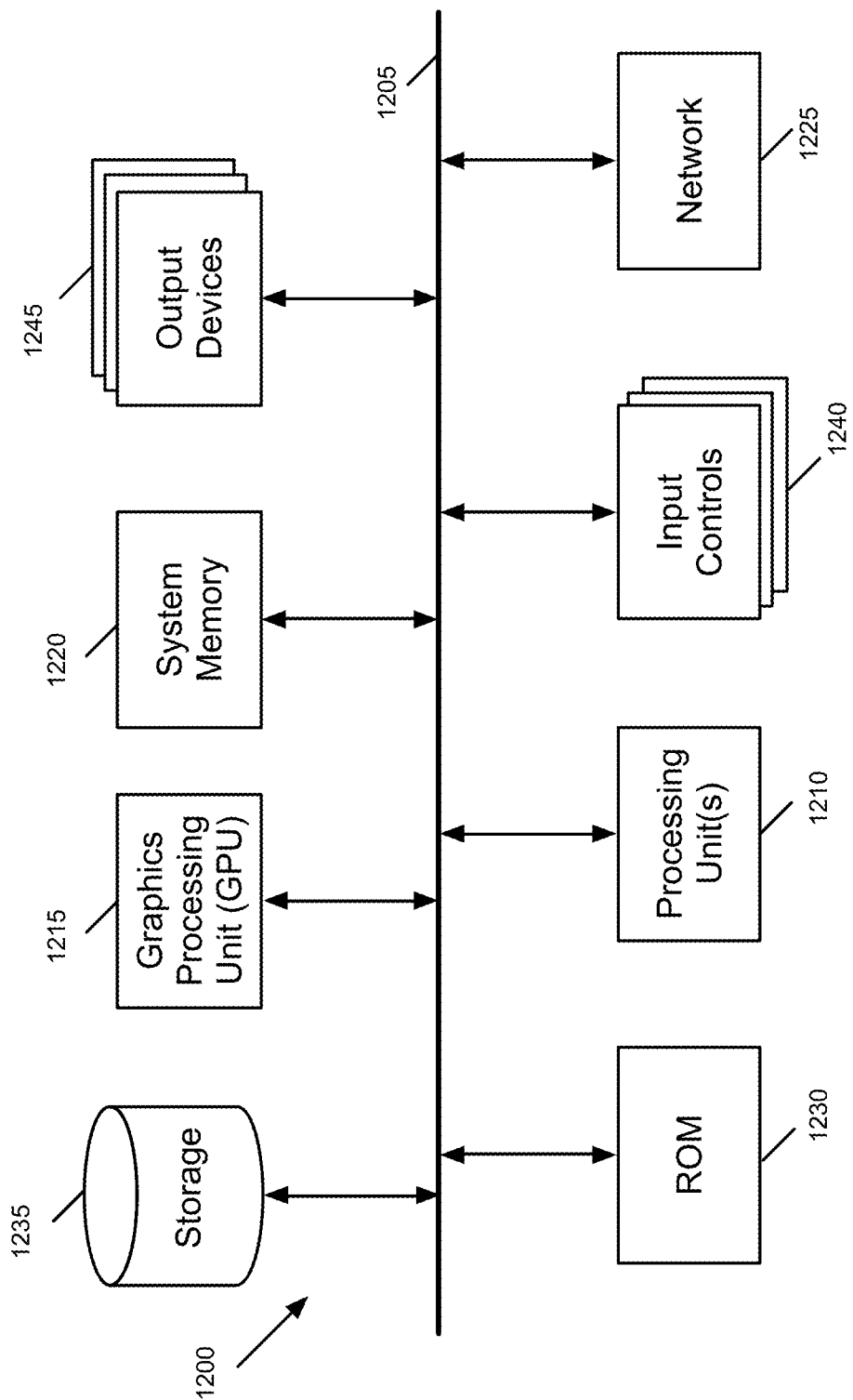
FIG. 12 illustrates an example of an electronic system with which some embodiments of the invention are implemented.

FIG. 12 conceptually illustrates another example of an electronic system 1200 with which some embodiments of the invention are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210. In some embodiments, such functionality can be provided using CoreImage's kernel shading language.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive, integrated flash memory) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet), or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 13:
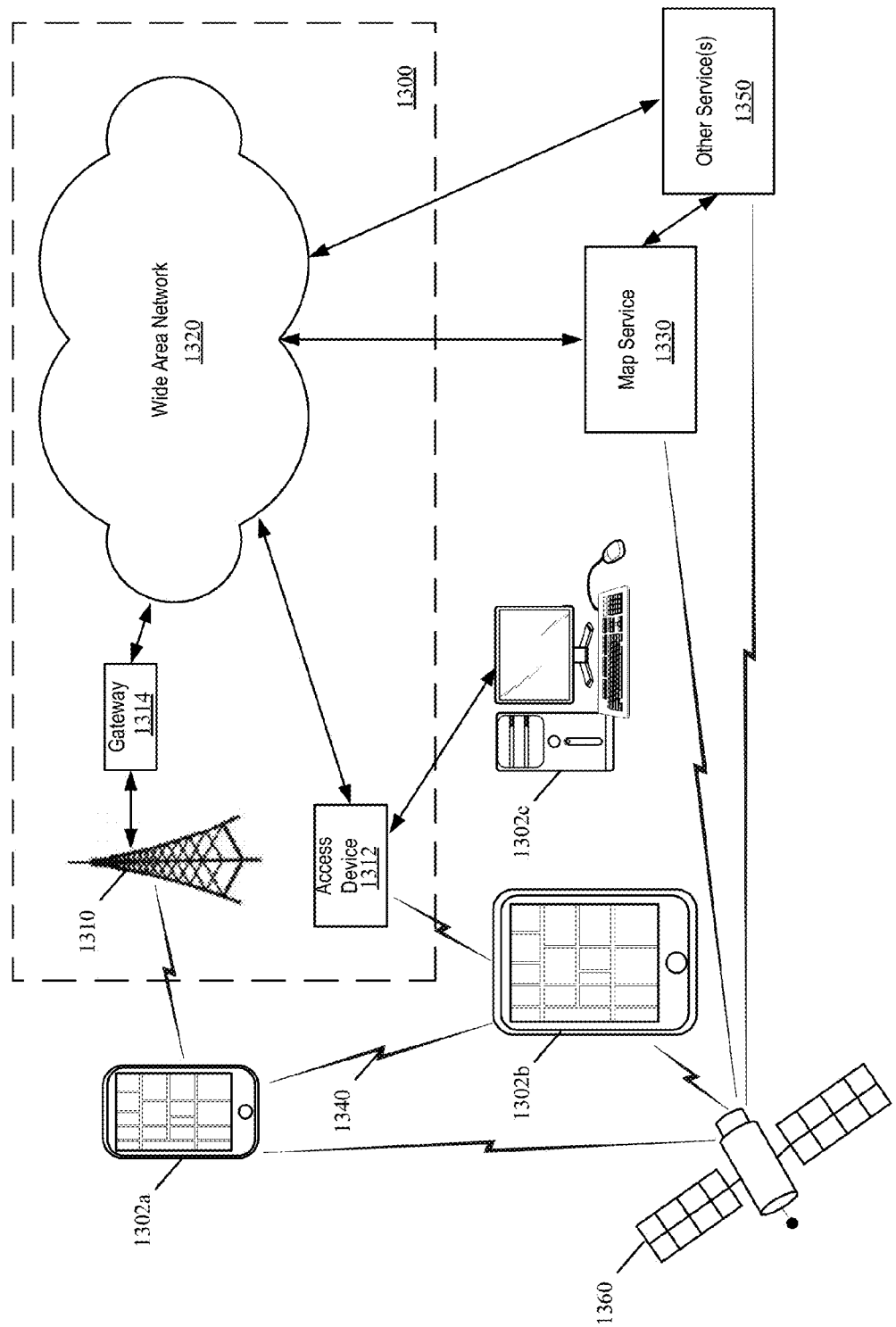
FIG. 13 illustrates a map service operating environment, according to some embodiments.

Various embodiments may operate within a map service operating environment. FIG. 13 illustrates one possible embodiment of an operating environment 1300 for a map service (also referred to as a mapping service) 1330 and client devices 1302*a*-1302*c*. In some embodiments, devices 1302*a*, 1302*b*, and 1302*c* communicate over one or more wired or wireless networks 1310. For example, wireless network 1310, such as a cellular network, can communicate with a wide area network (WAN) 1320, such as the Internet, by use of gateway 1314. A gateway 1314 in some embodiments provides a packet oriented mobile data service, such as General Packet Radio Service (GPRS), or other mobile data service allowing wireless networks to transmit data to other networks, such as wide area network 1320. Likewise, access device 1312 (e.g., IEEE 802.12g wireless access device) provides communication access to WAN 1320.

The client devices 1302*a* and 1302*b* can be any portable electronic or computing device capable of communicating with a map service (e.g., smart phone, tablet, laptop computer, etc.). Device 1302*c* can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1302*a*-1302*c* are not shown as each accessing the map service 1330 via either the wireless network 1310 and gateway 1314 or the access device 1312, one of ordinary skill in the art will recognize that the client devices of some embodiments may access the map service via multiple different wired and/or wireless protocols.

Devices 1302a-1302c can also establish communications by other means. For example, these devices may communicate with other wireless devices (e.g., other devices 1302b, cell phones, etc.) over the wireless network 1310 or through access device 1312. Likewise the devices 1302a-1302c can establish peer-to-peer communications 1340 (e.g., a personal area network) by use of one or more communication subsystems, such as Bluetooth® communication or similar peer-to-peer protocols.

Devices 1302a-1302c may also receive Global Positioning Satellite (GPS) signals from GPS satellites 1360. In addition, in some embodiments the map service 1330 and other services 1350 may also receive GPS signals from GPS satellites 1360.

A map service 1330 may provide map services for one or more client devices 1302a-1302c in communication with the map service 1330 through various communication methods and protocols. A map service 1330 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1302a-1302c may utilize these map services to obtain the various map service data, then implement various techniques to process the data and provide the processed data to various entities (e.g., internal software or hardware modules, display screens of the client devices, external display screens, or other external systems or devices.

The map service 1330 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1302a-1302c, the map service 1330 of some embodiments, performs various optimization techniques to analyze a map tile before encoding the tile.

In some embodiments, the map tiles are generated by the map service 1330 for different possible display resolutions at the client devices 1302a-1302c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1330 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1330 responds to requests from the client devices 1302a-1302c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1302a-1302c that obtain map service data from the map service 1330 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1302a-1302c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1330. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1302a-1302c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1330 and/or other service(s) 1350 are configured to process search requests from any of the client devices. Search requests may include but are not limited to queries for businesses, addresses, residential locations, points of interest, or some combination thereof. Map service 1330 and/or other service(s) 1350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1330 and/or other service(s) 1350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1330 and/or other service(s) 1350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1330 and/or other service(s) 1350 provide one or more feedback mechanisms to receive feedback from client devices 1302a-1302c. For instance, client devices may provide feedback on search results to map service 1330 and/or other service(s) 1350 (e.g., feedback specifying ratings, reviews, temporary or permanent business closures, errors etc.); this feedback may be used to update information about points of interest in order to provide more accurate or more up-to-date search results in the future. In some embodiments, map service 1330 and/or other service(s) 1350 may provide testing information to the client device (e.g., an A/B test) to determine which search results are best. For instance, at random intervals, the client device may receive and present two search results to a user and allow the user to indicate the best result. The client device may report the test results to map service 1330 and/or other service(s) 1350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, a number of the figures (e.g., FIGS. 2 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A non-transitory machine readable medium storing a program which when executed by at least one processing unit of a device displays a map, the program comprising sets of instructions for:
   receiving a request to display the map of a geographic region;
   receiving data defining the map over a communication network;
   examining data embedded within the data defining the map to determine whether a natural viewing orientation is defined for displaying the map, wherein the natural viewing orientation is different than a geographic orientation and is not based on a current direction of travel of the device;
   inputting a zoom level through an interface of the device;
   when the natural viewing orientation is defined, using a rule to determine if the input zoom level for displaying the map at the defined natural viewing orientation is valid, and displaying the map on a display screen according to the natural viewing orientation without receiving further input through the interface when it is determined that the zoom level is valid; and when it is determined that the zoom level is invalid for displaying the natural viewing orientation, displaying the map on the display screen according to the geographic orientation of the map.

2. The non-transitory machine readable medium of claim 1, wherein the geographic orientation of the map is north-up orientation.

3. The non-transitory machine readable medium of claim 1, wherein the geographic orientation of the map is an orientation that is set by one of the geographic directions.

4. The non-transitory machine readable medium of claim 1, wherein the set of instructions for examining data to determine whether the map has a natural viewing orientation comprises a set of instructions for analyzing content displayed in the map to determine whether the natural viewing orientation of the map should differ from the map's geographic orientation.

5. The non-transitory machine readable medium of claim 4, wherein the content of the map includes a set of roads displayed on the map.

6. The non-transitory machine readable medium of claim 4, wherein the content of the map includes a set of landmarks displayed on the map.

7. The non-transitory machine readable medium of claim 1 further comprising sets of instructions for:
displaying a compass to identify a geographic direction;
receiving selection of the compass;
assessing a type of selection of the compass; and
based on the assessed type, rotating the map to the geographic viewing orientation or the natural viewing orientation.

8. The non-transitory machine readable medium of claim 1, wherein the geographic orientation of the map is a north-up orientation and the natural viewing orientation is an orientation rotated from the north-up orientation.

9. A non-transitory machine readable medium storing a program which when executed by at least one processing unit of a device displays a map, the program comprising sets of instructions for:
receiving a request to display a map of a particular region;
receiving data defining the map of the particular region over a communication network;
examining metadata embedded within the data defining the map of the particular region to determine whether the metadata specifies a natural viewing orientation for the particular region of the map, wherein the natural viewing orientation is different than a geographic orientation and is not based on a current direction of travel of the device;
inputting a zoom level through an interface of the device;
when the natural viewing orientation is defined, using a rule to determine if the zoom level for displaying the map at the defined natural viewing orientation is valid, and displaying the map of the particular region on a display screen according to the natural viewing orientation without receiving further input through the interface when it is determined that the zoom level is valid; and
when it is determined that the zoom level is invalid for displaying the natural viewing orientation, displaying the map of the particular region on the display screen according to the geographic orientation of the map.

10. The non-transitory machine readable medium of claim 9, wherein the geographic orientation of the map is a south-up orientation and the natural viewing orientation is an orientation rotated from the north-up orientation.

11. For a device, a method for displaying a map, the method comprising:
receiving a request to display a map;
receiving data defining the map over a communication network;
examining metadata distributed with the data defining the map to determine whether a natural viewing orientation is defined for displaying the map, wherein the natural viewing orientation is different than a geographic orientation and is not based on a current direction of travel of the device;
inputting a zoom level through an interface of the device;
when the natural viewing orientation is defined, using a rule to determine if the zoom level for displaying the map at the defined natural viewing orientation is valid, and displaying on a display screen the map according to the natural viewing orientation without receiving further input through the interface when it is determined that the zoom level is valid; and
when it is determined that the zoom level is invalid for displaying the natural viewing orientation, displaying on the display screen the map according to the geographic orientation of the map.

12. The method of claim 11, wherein the geographic orientation is north-up orientation.

13. The method of claim 11, wherein the geographic orientation is an orientation that is set by one of the geographic directions.

14. The method of claim 11, wherein the metadata is automatically generated by analyzing harvested data regarding adjusted viewing orientations of the map.

15. The method of claim 11 further comprising:
displaying a compass to identify a geographic direction;
receiving selection of the compass;
assessing a type of selection of the compass; and
based on the assessed type, rotating the map to the geographic viewing orientation
or the natural viewing orientation.

16. The method of claim 11, wherein the natural viewing orientation is an orientation rotated from geographic orientation.

* * * * *